G. HABICH.
Beer Making Apparatus.
No. 20,488.
3 Sheets—Sheet 1.
Patented June 8, 1858.
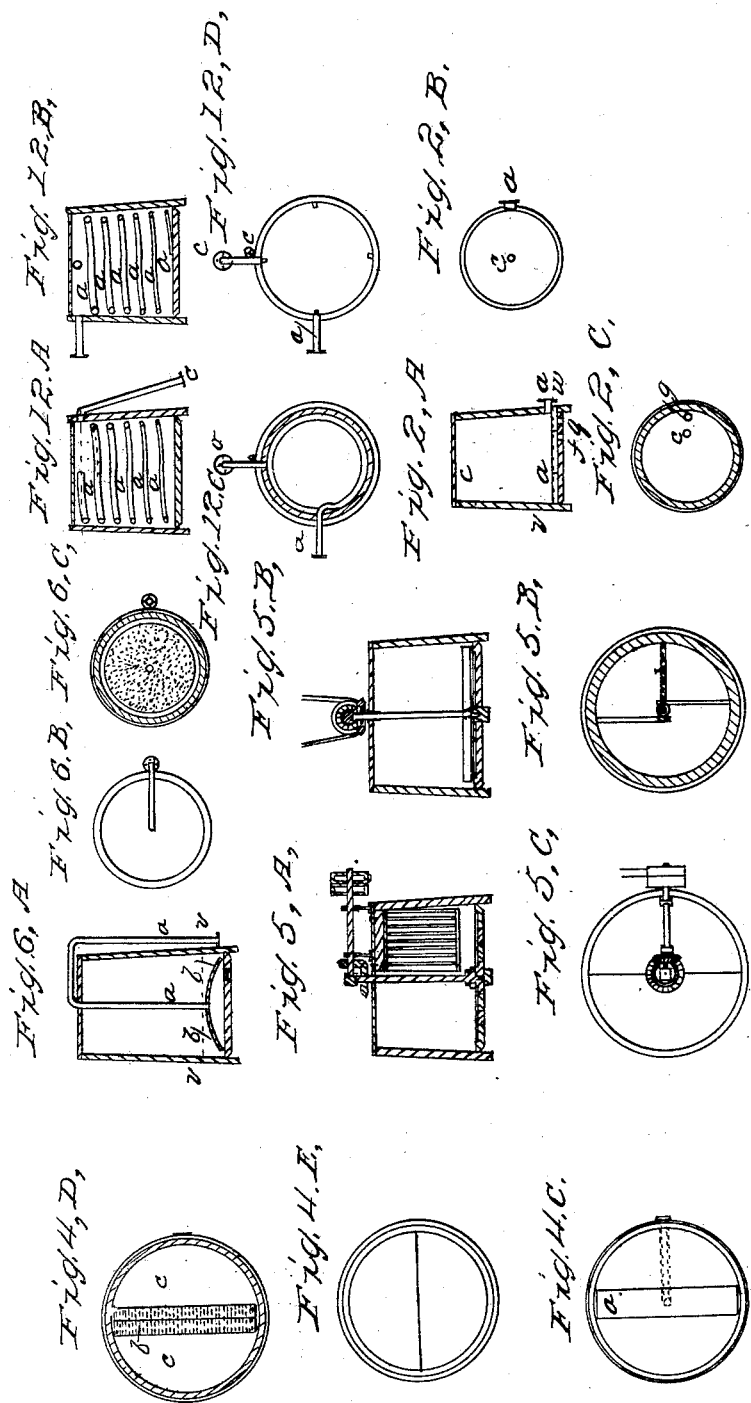

G. HABICH.
Beer Making Apparatus.
No. 20,488.
3 Sheets—Sheet 2.
Patented June 8, 1858.
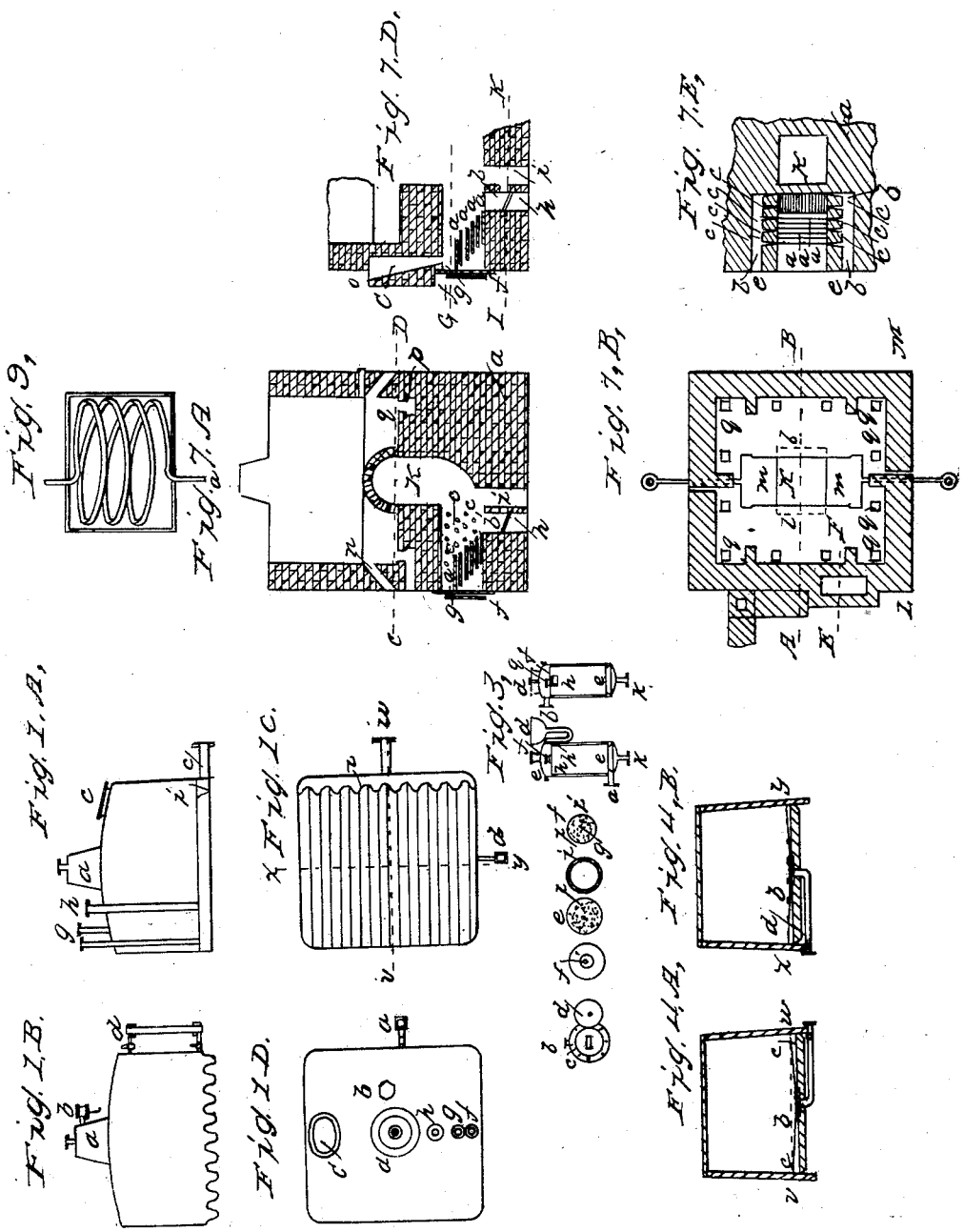

G. HABICH.
Beer Making Apparatus.
No. 20,488.
3 Sheets—Sheet 3.
Patented June 8, 1858.
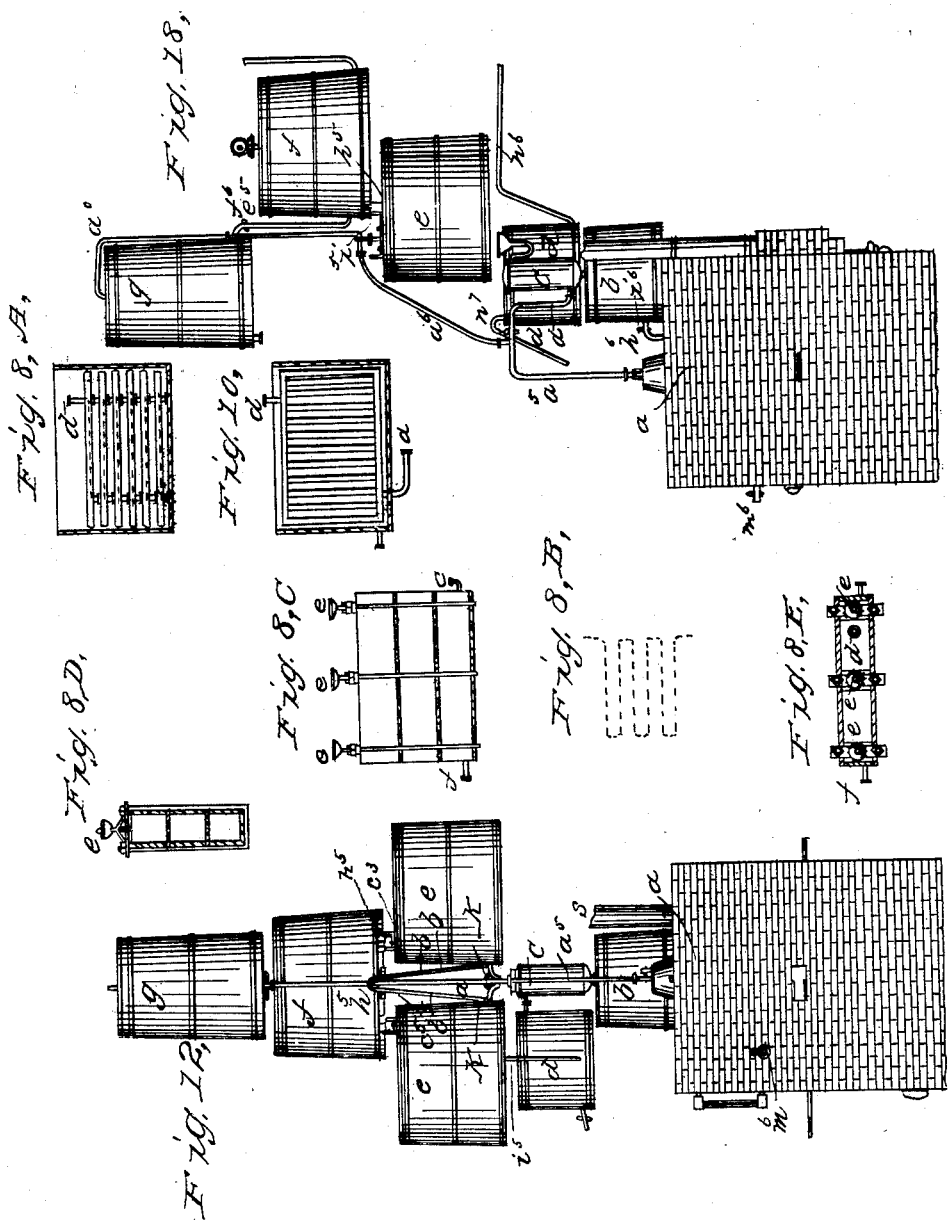

UNITED STATES PATENT OFFICE.

GEORGE HABICH, OF ROXBURY, MASSACHUSETTS.

APPARATUS FOR MANUFACTURE OF BEER.

Specification of Letters Patent No. 20,488, dated June 8, 1858.

*To all whom it may concern:*

Be it known that I, GEORGE HABICH, a resident of Roxbury, in the county of Norfolk and State of Massachusetts, have invented an Improved Apparatus for Brewing or Manufacturing Beer; and I do hereby declare that the same is fully described and represented in the following specification and the accompanying drawings, of which—

Figure 12, is a front elevation, while Fig. 13, is a side elevation of such apparatus. The other figures will be hereinafter particularly referred to and described.

Before I enter upon an explanation of my apparatus, I will relate some appropriate results of scientific experience which gave me the impulse to these improvements.

Experience shows that the purest and best keeping beer is produced, when with a complete separation of the albumen takes place, also the separation of the dissolved vegetable glue through the addition of carbonic acid, alkalis or earths (showing the reason for the employment of animal charcoal). It is sufficient for my purpose to know the presence of the diastase. To produce this operation as shown above could hardly be expected of a brewer, unless he were a chemical experimenter. Experience teaches us that the result, *i. e.* the better keeping quality of the beer—is satisfactory, if we restrict ourselves to the separation of the albumen, regardless of the quantity or quality of the yeast engendered through the fermenting process. For this boiling of the wort I use a closed copper or kettle; its steam I employ for new mashing and increase its pressure by a superincumbent column of water. This steam enters directly into the mash, and the increasing height of the water increases also the boiling point of the wort contained in the copper. This increased temperature manifests itself in stirring up again the wort, after it becomes clear, and finally the wort clears itself of all the coagulated albumen. The only thing to be observed is that the temperature should be sufficiently high, *i. e.* the steam pipe must be closed by a sufficient column of water.

The usefulness of this method as regards the keeping quality of the beer shows itself also in this: The beer, especially that free from vegetable glue, clarifies quicker after fermentation. This is apparent, as the dissolved albumen and glue, increase the specific weight of the fluid. Therefore the same becomes lighter through its separation because the yeast must separate more rapidly from this lighter fluid.

The use of a closed brewing vessel with a closed steampipe, is the very first requirement of a rational brewing. Experience shows that it is sufficient if the steampipe is immersed three feet deep in the wort, which is equal to a temperature of 225°. In the English porter breweries, they have for a long time used these closed coppers and the steam engendered in them after passing through the wort has been employed sometimes to heat the pan above. But the use of a closed steampipe as explained above has never been employed prior to my invention.

Having recognized the great importance, which the closed copper holds in the manufacture of a good and well keeping beer, it became my aim to free it of all its faults. What I have accomplished is: 1st. My apparatus works with perfect security and explosions are impossible. 2nd. It may be so arranged and constructed and its single operation so well regulated as to make as many as twelve brewings per day, which reduces the time of boiling for each brewing to two hours. This establishes the advantage of brewing continually as follows: 1st. The separate parts of the apparatus can be made smaller than when used in the ordinary ways, and therefore can be constructed at a less expense. 2nd. We employ a small mashing machine and keep it in constant use, whereas in other breweries they use the mashing machine only from time to time. 3rd. In a very great saving of fuel.

The application of steam as a conductor of heat has been the means of several advantageous improvements in my apparatus. Among these is a great economy in the use of the hops. Having succeeded in purifying the wort of all that endangers the keeping quality of the beer, it ceases to be necessary to force this quality, through the quantity of the hops, and all that is needed is to measure this quantity according to the tastes of the consumers. It is a fact that the present breweries, and especially the lager beer breweries of the United States, brew too bitter beers for the market intending to give through a greater quantity of hops, the keeping qualities to their otherwise poor products.

In order to get the greatest gain from this small quantity of hops, which is weighed separately for each brewing, I have been best satisfied with the following process. The hops after being pulverized are to be put into the hop holder or vessel hereinafter described and permeated by the steam for the space of ten or fifteen minutes. This ruptures their cells and exposes their contents. The ethereal oil of hops volatilizes and is condensed, to be used as required in the after fermentation of the beer. To use it sooner is useless as in the principal process of fermentation it would be carried off by the huge quantity of carbonic acid gas then developed. After the steaming, the almost boiling wort which is now ready for clarifying, is filtered through the opened hops into the vessel for the heating of the wort. This process dissolves the contents of the cells necessary for the purposes of the brewer. A further advantage of the steaming is the most complete extraction of the malt gained through the gradual increase and complete control of the temperature, and this enables me to follow a very peculiar system of brewing. For the production even of the less strong beers (common lager beers) only concentrated worts are used, and this offers the following advantages:

1st. The gain from the extraction of the malt is double and treble compared with the usual method and this with the same expense of labor and fuel. Through dilution of the same after the cooling, more beer is gained, in the same proportion, and the concentration of it becomes entirely optional. This clearly demonstrates that it is not the concentration of the wort which the boiling effects, but merely its purification at a higher temperature.

2nd. The fluid to be cooled (the production of beer remaining the same), is now only one half to one third of what it was originally. The refrigerator into which cold water is introduced, may therefore be smaller in the same proportion. Through the subsequent dilution with very cold water, we reduce the cooled wort to the same temperature which is required for a slower fermentation. In mid summer this cooling can be carried to a great height, in the wort which is diluted enough by dissolving ice in it.

I come now to speak upon the process of cooling. It is self evident, that with a system of brewing, which even in summer delivers a boiling of wort to the refrigerator, once in two hours, a rapid cooling apparatus is required. Thus coolers which come in contact with a running stream of cold water on the one hand and with the wort to be cooled, on the other are to be preferred.

The advantages of the above are fully realized in the box coolers constructed by me and hereinafter described as useful accessories to my invention.

The following constitute the cooling apparatus: 1st, a cooling worm within a vessel (see Fig. 9). 2nd, a number of upright pipes in a small box. The box contains the wort, and the pipes the cold water as seen in Fig. 10. So much for the cooling apparatus.

In conclusion I have a few remarks to make about the heating apparatus of my invention. It is owing to my system of continuous brewing, that I am able to avail myself of all the improvements made in this branch of it, as it would be hardly worth while to employ them in the common breweries. Not only can I use the worst fuel at the greatest advantage, but with little emission of smoke from the chimney. To gain my end, I have employed some time in examining the various systems of heating; have selected three well tried contrivances, have united them in a peculiar manner, and have adapted to the requirements of my system of brewing.

First. I have employed stair grates with the admission of air through pipes and the hot air mantel, the whole being combined in a horizontal fire chamber. The quantity of air necessary to a combustion without smoke is regulated by slides. The chimney does not serve for an increase of draft but only as a conductor for burnt gases; for that reason, it need rise but just above the ridgepole of the building containing the apparatus. The heat generated in this way is conducted downward through a flue which forms the continuation of a channel for the cooled gases, and thus used in the most economical manner. This contrivance operates so that the heated gases from the forechamber remain at the bottom of the boiler, and only escape through the chimney after having become cool. To protect the bottom of the copper, which remains without fluid after every brewing, and also to save the last remnants of the wort from the detrimental effects of the heat, I have employed slides which arrest the progress of the heat and enable me to cool the bottom of the boiler at pleasure by introducing cold air into the space below it. My brewing apparatus is distinguished from others in use, 1st. By the peculiar combination and arrangement of its constituent parts, by which not only the waste steam from the copper is made to assist in, or facilitate the various operations carried on in the vessels above the copper, but the copper is so placed or arranged with respect to the other vessels that the liquid extracts of the malt and the hops flow down into it instead of being pumped up into it, as they generally are in breweries.

2nd. In my apparatus, the hops are not suffered to pass into the copper, but are placed in a separate vessel and there treated so as to obtain their extract by the wort being passed through them. The wort after being impregnated with the extract of the hops flows into the copper. Thus, the operation of separating the hops from the wort after the latter has been boiled is avoided.

3rd. The wort is heated by the waste steam and thus in a heated state is received into the copper it being warmed in the wort warmer before it is introduced into the copper.

4th. The essential oil of the hops is taken from them without being carried into the copper to a greater degree than is desirable.

5th. In my apparatus, a wort warmer separate from the copper is used in connection with the copper, the hop vessel, the filtering vessel and the mashing tun such affording advantages as herein specified.

6th. By having a water heater by which the waste steam is condensed and its heat saved so as to be used in the other parts of the apparatus.

Having thus premised, I shall now proceed more particularly to describe my invention or apparatus.

In Figs. 12, and 13, $a$, denotes the brickwork of the copper or boiler, such boiler being shown in Fig. 7, (A) as resting directly on an arch, $l$, $l$, and being more particularly exhibited in Fig. 1, (A) Fig. 1, (B,) Fig. 1, (C), and Fig. 1, (D). $b$, of said Figs. 12, and 13, is a wort warmer placed above the copper; $c$, is the hop vessel arranged above the wort warmer and on a level with $d$, which is a refrigerating box connected with the hop vessel, and containing a cooling worm for the condensation of steam charged with the essential oil of hops; $e$, $e$, are filtering vessels placed above the hop vessel, $c$, and having over them a mashing tun, $f$, provided with a stirrer or mashing machine to be hereinafter described. Disposed above the mashing tun is a vessel, $g$, the purpose of which is to heat or boil water. These several vessels are connected by pipes as shown in the drawings—that is to say, a steam pipe, $a^5$, leads out of the top or upper part of the copper, and nearly to the level of the top of the hop vessel, and from thence is bent horizontally toward the said hop vessel, and thence downward and enters the lower part of the same, as shown at $k$, in Fig. 3. From the middle of the upper part of this pipe, another pipe, $a^6$, passes upward over the filtering vessels, $e$, $e$, and in front of the mashing tun, $f$, and to the top of the vessel, $g$, entering said vessel through its top and continuing down in the said vessel as shown at, $a$, in Fig. 6, (A). This pipe has a branch $b^5$, also leading from it and down into each of the filtering vessels as shown in Fig. 12, each of said branches being provided with a stop cock, $c^5$, near its upper end. The pipe, $a^5$, is also provided with a stop cock arranged as shown at $d^5$, Fig. 13. A pipe, $e^5$, furnished with a stop cock, $f^5$, (see Fig. 13,) leads from the lower part of the vessel, $g$, into the lower part of the mashing tun, and the said mashing tun communicates with each of the filtering vessels $e$, $e$, by a pipe, $h^5$ provided with a slide valve or cock $i^5$.

Faucets, $k^5$, $k^5$, Fig. 12, lead out of the filtering vessel, so as to discharge directly over and into the receiving tunnel $d$ (Fig. 3,) of the hop vessel. The wort warmer, $b$, communicates with the copper in the brickwork, $a$, (see Fig. 1, (A), and Fig. 2, (A,)) by three pipes arranged as shown at $f$, $g$, $h$ in Fig. 1, (A), and Fig. 1, (D), the pipe, $h$, of such figures being represented at $h^6$ in Fig. 13, where it is shown as provided with a stop cock.

Having thus explained the mode of arranging and connecting the several parts of my improved steam brewing apparatus, I shall proceed to describe the construction of each of them. The copper or boiler for boiling the wort, and which was before spoken of as resting on the arch, $l$, $l$, of Fig. 7, (A) marked "copper" in the said figure, is shown in vertical section in Fig. 1, (A); in side view in Fig. 1, (B,); in top view in Fig. 1, (D); and in bottom view in Fig. 1, (C,). Its object is for boiling the wort, and supplying the necessary steam to the mashing tun and hop vessel for the purpose of promoting the mashing operation and the opening of the hops. This copper or boiler may have any proper form, although I prefer that exhibited in the drawings, its size being calculated upon the wort produced in one brewing, the necessary allowance for "foaming up" being made. Of the utmost importance is the extent of the boiling surface as the copper or boiler has to supply, at each brewing, steam for boiling the mash and opening the hops as well as that for boiling the water in the vessel $g$, which is intended to supply any deficiency, of water that may take place in either of the other parts of the apparatus. For the purpose of increasing the boiling or heating surface of the bottom of the copper, such bottom may be corrugated (as shown in Fig. 1, (B,) and in Fig. 1, (C)) the corrugations terminating in a gutter $i$, (see Fig. 1, (A,) and, Fig. 1, (C)) out of which the wort may be delivered through a pipe $e$, (see Fig. 1, and $m^6$, Figs. 12 and 13.) The upper part of the boiler may be furnished with an air valve $b$, and a man hole $c$, and such boiler may also be provided with a glass gage or indicator $d$, by which the height of the liquid in the boiler or the clarification of the wort may be ascertained whenever necessary.

In Fig. 1, (A,), the pipes $f$, and, $g$, for connecting the boiler with the wort warming vessel $b$, are shown, the pipe, $g$, carrying the steam from the copper into the wort warmer, while the pipe, $f$, conducts the condensed water of the wort warmer back into the copper; $h$, is the pipe through which the wort flows from the wort warmer into the copper. This wort warming vessel is shown in Fig. 2, (A), Fig. 2, (B), and Fig. 2, (C), the first figure being a vertical section of it; the second, a top view of it, and the third, a horizontal section taken on the line $v$, $w$, of Fig. 2, (A). This wort warming vessel, has, at an elevation of about two inches above its bottom, a second bottom, $a$, (see Fig. 2, (A)) made of thin copper sheathing resting on suitable supports. The pipes, $f$, and, $g$, open under this secondary bottom and into the shallow space below the same, one pipe conveying steam into such space, while the other carries back into the boiler, the water condensed in such space; $c$, (Fig. 2, (A) and Fig. 2, (B)) denotes the opening through which the wort passes from the hop vessel while such wort is being conducted into the copper through the pipe $d$, (Fig. 2, (A), Fig. 2, (B) and, $h^6$, Fig. 13.) In Fig. 2, (A), $e$ denotes a cover for the wort warmer.

In constructing the vessel, great care should be taken to have the copper bottom fitted perfectly tight around its edges and properly stayed so as to prevent it from being injured by the pressure of the steam. A wort warmer applied to the copper, the hop vessel, the filtering vessels and the mashing tun renders the apparatus far more complete and effective in operation, than it otherwise would be, as by means of such wort warmer, we are enabled to collect the wort as it gradually filters or runs out of the hop vessel, and store it to be used in the copper as occasion may require. To get along without this wort warmer, the area or capacity of the filtering vessels $e$, $e$, (Fig. 12,) as well as that of the hop vessel would have to be materially increased and this would entail inconvenience as well as greater expense in the construction and operation of the parts.

The hop vessel which is shown in Fig. 3, may be thus described. It is to be made of copper and provided with a movable cover $c$, and a tunnel, $d$, which opens into its upper end as shown in the drawings. It also contains a second cylindrical vessel $e$, made to fit into it and have its bottom perforated with holes the top of such vessel $f$, being also perforated with numerous holes and connected by a bayonet catch, and provided with a handle, $g$. Preparatory to being inserted in the hop vessel, the hop holder is to be filled with hops. To make this apparatus work to advantage the bent pipe of the tunnel $d$, should contain a liquid, that is, when the apparatus is first set to work, the pipe should be filled with water. Afterward, the wort flowing into the tunnel in the pipe will take the place of this water and seal the vessel from the escape of vapor charged with the essential oil of hops. This vapor will flow out of the discharge tube, $b$, (Fig. 3) and into the worm of the condenser, shown at $d$, in Figs. 12, and 13. The steam from the copper on entering the lower part of the hop vessel will permeate the hops, extract the essential oil therefrom and pass off through the said pipe, $b$, into the condenser as described, such condenser being represented in vertical section in Fig. 12, (A) and Fig. 12, (B); in horizontal section in Fig. 12, (C); and in top view in Fig. 12, (D). This condenser consists of a tub and a worm or condensing pipe $a$, $a$, arranged therein. It has a pipe, $c$, for supplying it with cold water and another for the discharge of the same, such pipes being represented at $n^6$, and $n^7$, in Fig. 13.

Fig. 4, (A), and Fig. 4, (B), are transverse sections of the filtering vessels; Fig. 4, (C), is a horizontal section taken on a line $v$, $w$, of Fig. 4, (A); Fig. 4, (E), is a top view, and Fig. 4, (D,) another horizontal section taken on line $x$, $y$, of Fig. 4, (B).

Each of the vessels is provided with a gutter, $a$, sunk in and across its bottom, and covered by a perforated cast iron plate, $b$, the discharge pipe leading out of said gutter. The upper surface of the bottom is made inclining as shown at $c$, $c$, in Fig. 4, (A) and Fig. 4 (B). As the mash is heated in the vessels to the boiling point before being clarified, the steam pipe from the boiler is made to communicate with them as before described in order to hasten the distribution of heat or facilitate or increase the heat of the mash as circumstances may require.

The mashing tun $f$, (Figs. 12 and 13) is represented in vertical section in Fig. 5 (A) and Fig. 5, (B); and in top view in Fig. 5, (C), and in horizontal section in Fig. 5, (D). It consists simply of a closed tub or vessel containing a rotary stirrer and constructed essentially like the mashing tun in ordinary use.

The vessel, $g$, Figs. 12 and 13, for heating the water, by means of waste steam is represented in Fig. 6, (A) in vertical section; in Fig. 6 (B) in top view, and in Fig.

6, (C) in horizontal section on the line v, w, of Fig. 6, (A). This vessel is of very simple construction. It consists of a tub into which the steam pipe enters as before described. Such steam pipe terminates in a perforated meniscus shaped disk b, b, as shown in Fig. 6, (B) and in Fig. 6, (C). The water in it being always higher than in the other vessels, there is no need of shutting off the steam which may be allowed to flow freely into it. The steam pipe arranged in this vessel as described affords not only the simplest, but at the same time, the surest substitute for a safety valve for the apparatus.

In Fig. 7, the smoke consuming furnace is represented in vertical section, the same being taken on the line A, B, of Fig. 7, (B), this latter figure being a horizontal section taken on line, C, D, of Fig. 7, (A).

Fig. 7, (D,) represents a vertical section taken on the line E, F, of Fig. 7, (B). Fig. 7, (E) is a horizontal section of the firebox or fire place, taken on the line, G, H, of Fig. 7, (D). In such drawings, a, a, represent plates placed in echelon, one above the other, and forming what I term the scale grate, in advance of and below which is a bar grate b; under the latter is an ash pit, a', in front of which and the grate is a space i, for reception of the clinkers. From an air space b' on each side of the fire place, air passages, c, c, convey air into the furnace, the air being heated in the said spaces b', by the heat radiated from the walls of the furnace or fireplace. The spaces b', b', may be provided with registers for regulating the admission of air into them by which the amount of air necessary to the complete combustion of the smoke may be determined. The furnace door, shown at f, may be constructed with an air passage leading upward through it, and provided with openings into the furnace as shown at g, in Fig. 7, (A). From the furnace, or fire place, a flue, k, leads the hot gases under the boiler, the said flue k, being provided with one or more iron slides by which it may be opened or closed as occasion may require. The brick work surrounding the space under the boiler, may also be provided with flues, n, n, for the introduction of cold air into such space for the purpose of cooling the boiler, while the wort is flowing off. These channels, n, n, may also be furnished with registers. Over the fireplace is a tunnel shaped passage, C, (see Fig. 7, (D),) for containing the fuel, the same being supplied to such passage by an opening, o. The fuel, as fast as may be necessary, sinks from the passage, C, down upon the uppermost step of the scale grate, and while resting on the several steps.

p, is a flue running around in the masonry and communicates with the space under the copper by openings, q, q, and with the chimney, s, by a flue, r, the same serving to carry off the spent gases and smoke.

For the purpose of cooling the wort after its clarification and removal from the copper, any common refrigerating apparatus may be employed. Such as I have used to advantage is shown in side view in Fig. 8, (C,); in transverse section in Fig. 8, (D,); in top view, in Fig. 8, (E,), and in longitudinal section in Fig. 8 (A,). It consists of a series of shallow horizontal vessels placed within a closed reservoir and so connected that the liquid in passing through them shall take a zigzag course, represented by dotted lines in Fig. 8, (A) and Fig. 8, (B), the outside surfaces of the vessels, being exposed to a current of cold water, which may be made to flow into the next surrounding vessel by a pipe c, and be discharged out of the same by a pipe f.

Fig. 10, exhibits another form of a refrigerating vessel or apparatus, consisting of a wooden box containing a number of upright pipes, connected by a horizontal one, and having inlet and outlet pipes as shown at a, and b.

Fig. 9, represents another form of a cooler, consisting of a coiled pipe placed in a reservoir. The wort may be made to flow into the pipe at a, and be discharged at b.

In operating with the apparatus hereinbefore described, the mash from the mashing tun, after descending into the filtering vessels, and being there filtered, passes into and through the hop vessel where it becomes charged with the extract of the hops. From thence it passes into the wort warmer, from which it is drawn into the copper or boiler and there boiled and clarified—the waste steam from the copper, which in most breweries is suffered to flow off into the atmosphere being conveyed by the steam pipes, hereinbefore described, into the others parts of the apparatus, so as to facilitate their operations, and as a necessary consequence not only effect a great economy in the amount of fuel, but an improvement in the beer, as well as in the process of making the same.

Having thus described my invention, I would remark, that I claim—

1. The combination, arrangement and connection of the copper, the mashing tun, the filtering vessel or vessels, and the hop vessel substantially as above specified, whereby the several operations connected with each of such parts can be conducted through the agency of the heat from one furnace and steam from its copper substantially as hereinbefore specified.

2. I also claim combining and arranging the wort warmer with the copper, the hop vessel, the filtering vessel or vessels, and the mashing tun, so as to operate therewith substantially as set forth.

3. I also claim the combination of the condenser $d$, the hop vessel, the copper, the filtering apparatus and the mashing tun as connected and arranged so as to operate together substantially as specified.

4. I also claim the arrangement and combination of the water heater, the mashing tun, the filtering apparatus, the hop vessel, and the copper as connected and made to operate together substantially as set forth.

In testimony whereof, I have hereunto set my signature this sixth day of October 1857.

GEORGE HABICH.

Witnesses:
F. R. HALE, Jr.,
EDWD. HABICH.